J. B. WHITCOMB.
Vehicle-Spring.
No. 225,087.    Patented Mar. 2, 1880.
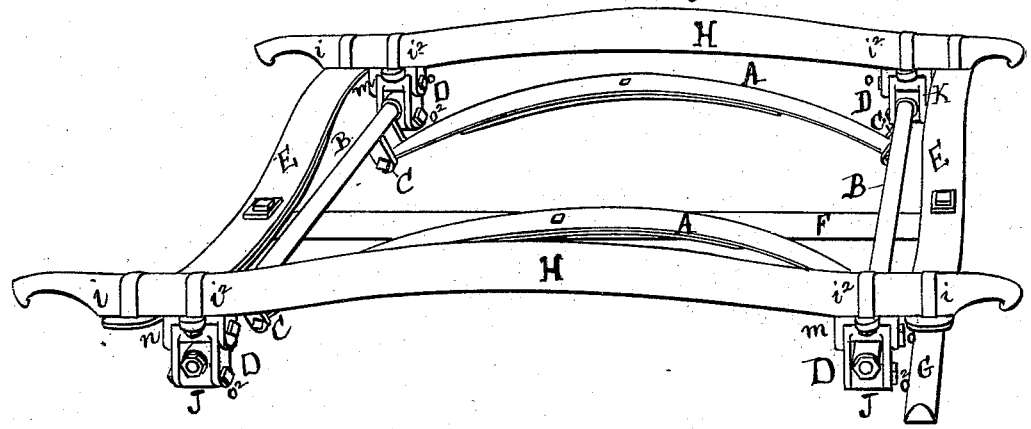
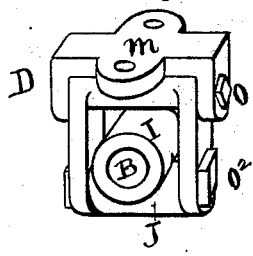 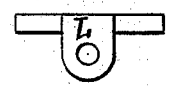 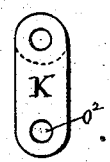 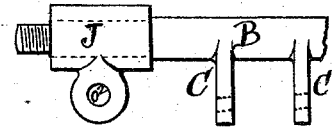
Attest.
C. O. Tattershall.
L. W. Richardson.
Inventor.
John B. Whitcomb

UNITED STATES PATENT OFFICE.

JOHN B. WHITCOMB, OF BELOIT, WISCONSIN.

VEHICLE-SPRING.

SPECIFICATION forming part of Letters Patent No. 225,087, dated March 2, 1880.

Application filed October 31, 1879.

*To all whom it may concern:*

Be it known that I, JOHN B. WHITCOMB, of the city of Beloit, Rock county, in the State of Wisconsin, have invented certain new and useful improvements in the method of attaching to and better utilizing springs on wheeled vehicles, of which the following is a specification.

The invention relates particularly to an improved method of utilizing on, as well as partly in the manner of attaching, springs to that class of wheeled vehicles commonly known as "buggies" or "carriages;" and the object of the invention is to secure greater ease and comfort to those who employ this class of vehicles in traveling for business or pleasure in general, but particularly where rough or uneven roads are to be traversed. My invention may, however, be advantageously used in any class of spring-wagons or carriages.

The invention consists in the combination, with the longitudinal springs of the vehicle, of the peculiar mechanism to which they are pivoted at their front and rear ends by means of vertical hangers, which are pendent from oscillating transverse shafts, which also, at each of their ends, are jointed to oscillating hangers vertically pendent from the side bars of the vehicle, so that the longitudinal springs upon which the body of the carriage is to be fixed and supported will have a free and easy lateral vibratory motion whenever a wheel or wheels on either side of the vehicle shall strike an obstruction in the roadway which gives an oblique or lateral jar to said vehicle; and in like manner a similar but longitudinal vibration of the body of the carriage will occur whenever either or both of the forward wheels shall encounter an obstacle in the road.

By means of this invention the usual jerks and jolts suffered in riding over rough roads are obviated, the running-gear of the vehicle sustaining the shock that would, in carriages using springs constructed, arranged, and applied according to methods heretofore in use, be communicated directly to and suffered by the occupants of the carriage, whereas by this invention a uniformly smooth and easy motion of the carriage is obtained, even in passing over rough roads, thus securing to those who use vehicles constructed and provided with springs containing this invention a high degree of ease and comfort.

In this invention it will be observed that the whole structure of the carriage above the running-gear is supported upon half-elliptic springs, thus also securing to the vehicle the advantage of a compound spring action; and, finally, the invention also consists in the combination and arrangements of all the parts coacting with each other, as shown in the drawings and hereinafter described.

In the accompanying drawings, in which similar letters of reference indicate like parts, Figure 1 is a perspective of a device embodying my invention. Fig. 2 is a detached view of one of the oscillating hangers of the transverse shafts which support the longitudinal springs of the vehicle. Fig. 3 is that part of the device shown in Fig. 2 which is secured to the side bar of the vehicle by a clip. Fig. 4 is an end view of that part of the device shown in Fig. 2 to which the ends of the transverse shafts are loosely journaled, and Fig. 5 is a detached section of one of the transverse shafts journaled to a detached section of the device shown in Figs. 1 and 2.

In the drawings, letter A represents the longitudinal springs hereinbefore mentioned and their functions described. B are oscillating transverse shafts, to which said longitudinal springs are pivoted at their front and rear ends by means of the hangers C, pendent from said transverse shafts, which said shafts are suspended below the side bars, H, of the vehicle by means of the oscillating devices D, which are secured to said side bars by clips $i^2$, all as shown. The oscillating hangers, consisting of the said devices D, are composed of the parts M, K, and I, the parts M being attached to the side bars, H, by the clips $i^2$, the part K, with the shaft B, journaled to the upper end of the part I, oscillating upon the bolt O, the lower end of the part I oscillating upon the bolt $O^2$, the body of the part I, however, always maintaining an exactly vertical position while rotating upon the bolt $O^2$, the ends of said bolt $O^2$ being rigid in the part K.

L, Fig. 3, is intended to represent a cross-section of the part M, Fig. 2. K, Fig. 4, is intended to represent a vertical end or side section of the part K of the device D, Fig. 2. B, Fig. 5, with the hangers C, is a detached section of one of the transverse oscillating shafts B, showing the end journaled to the part I, Fig. 1, and at the device D, Fig. 2. G shows one end of the wood part of the axle of the vehicle. F is the reach, and E shows half-elliptic springs attached to the side bars, H, by clips $i$, all as plainly shown in the drawings, and upon said springs E the whole of the vehicle above the running-gear is supported; and it will also be understood that when the vehicle is in use the longitudinal springs A will be depressed centrally, so as to be sufficiently elongated to hold the hangers C of the shafts B in about a perpendicular position, and whenever the forward wheels of the vehicle strike an obstruction the shafts B will suddenly oscillate in proportion to the intensity of the shock, which will thus be sustained by the running-gear and occasion no discomfort to the occupant of the carriage, the same being also true in respect to lateral vibration or oscillation of the vehicle from the same causes.

Having thus fully set forth my invention and the mechanism embodying the same, what I claim as new, and desire to secure by Letters Patent, is—

1. In combination with transverse rock-shafts B and hangers C, a laterally-oscillating device connecting the ends of said shaft to side bars, H.

2. In combination with side bars, H, transverse rock-shafts B, and hangers C, the devices D, operating as universal joints to allow motion in any direction.

3. In a wheeled vehicle, the combination and arrangement of the transverse shafts B, oscillating device D, with the longitudinal springs A and the transverse springs and side bars, when the whole is constructed substantially as and for the purpose specified.

JOHN B. WHITCOMB.

Attest:
C. O. TATTERSHALL,
L. W. RICHARDSON.